United States Patent
Brennan et al.

(10) Patent No.: US 7,555,404 B2
(45) Date of Patent: Jun. 30, 2009

(54) METHODS AND SYSTEMS FOR AUTOMATED PLY BOUNDARY AND ORIENTATION INSPECTION

(75) Inventors: Joseph Daniel Brennan, Shoreline, WA (US); Solomon T. Atsebha, Seattle, WA (US); John W. Dorsey-Palmateer, Gig Harbor, WA (US); Patrick L. Anderson, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/836,242

(22) Filed: Aug. 9, 2007

(65) Prior Publication Data
US 2009/0043533 A1 Feb. 12, 2009

(51) Int. Cl.
G06F 15/00 (2006.01)
B32B 38/00 (2006.01)
(52) U.S. Cl. .................................... 702/152; 156/64
(58) Field of Classification Search ............... 702/152, 702/150, 151, 153, 188; 700/57–62, 64, 700/66; 353/28, 122; 356/237.1, 429, 430; 156/64, 378, 379, 60, 349, 361
See application file for complete search history.

(56) References Cited

U.S. PATENT DOCUMENTS

| | | | |
|---|---|---|---|
| 3,775,219 A * | 11/1973 | Karlson et al. | 156/363 |
| 4,696,707 A * | 9/1987 | Lewis et al. | 156/64 |
| 4,714,339 A | 12/1987 | Lau et al. | |
| 5,223,072 A * | 6/1993 | Brockman et al. | 242/420.6 |
| 5,239,457 A * | 8/1993 | Steidle et al. | 700/57 |
| 5,506,641 A * | 4/1996 | Dorsey-Palmateer | 353/28 |
| 5,562,788 A * | 10/1996 | Kitson et al. | 156/64 |
| 5,651,600 A * | 7/1997 | Dorsey-Palmateer | 353/122 |

(Continued)

FOREIGN PATENT DOCUMENTS

EP 1857260 A1 11/2007

(Continued)

OTHER PUBLICATIONS

Shirinzadeh et al., Fabrication Process of Open Surfaces by Robotic Fibre Placement, 2004, Robotics and Computer-Integrated Manufacturing 20, pp. 17-28.*

(Continued)

*Primary Examiner*—Michael P. Nghiem
*Assistant Examiner*—Toan M Le
(74) *Attorney, Agent, or Firm*—Armstrong Teasdale LLP (57) ABSTRACT

A method for determining the positional laydown accuracy of an automated lamination machine during fabrication of a multiple layered part is described. The method includes measuring a position of a placement head of the lamination machine in a coordinate system, determining a location of a ply edge with respect to the placement head, transforming the location of the ply edge into the coordinate system, based on the measured head position, transforming the location of the ply edge from the coordinate system into a second coordinate system that is associated with the part being fabricated, and comparing actual ply edge location in the second coordinate system to an expected ply edge location defined in the second coordinate system, the second coordinate system associated with the part being fabricated, to determine the laydown accuracy of the machine.

23 Claims, 4 Drawing Sheets

U.S. PATENT DOCUMENTS

| | | | |
|---|---|---|---|
| 5,741,096 A | 4/1998 | Olds | |
| 5,867,297 A | 2/1999 | Kiang et al. | |
| 5,949,685 A | 9/1999 | Greenwood et al. | |
| 5,979,070 A | 11/1999 | Lau | |
| 6,000,801 A * | 12/1999 | Dillon et al. | 353/28 |
| 6,049,377 A | 4/2000 | Lau et al. | |
| 6,269,284 B1 | 7/2001 | Lau et al. | |
| 6,341,261 B1 | 1/2002 | Vasey-Glandon et al. | |
| 6,392,222 B1 | 5/2002 | Greenwood | |
| 6,681,145 B1 | 1/2004 | Greenwood et al. | |
| 6,799,081 B1 * | 9/2004 | Hale et al. | 700/98 |
| 6,843,565 B2 * | 1/2005 | Evans et al. | 353/28 |
| 6,871,684 B2 * | 3/2005 | Engelbart et al. | 156/361 |
| 6,980,881 B2 | 12/2005 | Greenwood et al. | |
| 7,027,162 B2 | 4/2006 | Lau et al. | |
| 7,048,024 B2 * | 5/2006 | Clark et al. | 156/425 |
| 7,080,441 B2 * | 7/2006 | Braun | 29/527.2 |
| 7,193,696 B2 | 3/2007 | Engelbart et al. | |
| 7,206,665 B2 * | 4/2007 | Groppe | 700/245 |
| 7,236,625 B2 * | 6/2007 | Engelbart et al. | 382/141 |
| 7,407,556 B2 * | 8/2008 | Oldani et al. | 156/64 |
| 2006/0106507 A1 | 5/2006 | Ledet et al. | |
| 2007/0034313 A1 * | 2/2007 | Engelbart et al. | 156/64 |
| 2007/0044561 A1 | 3/2007 | Engstrand et al. | |
| 2007/0127015 A1 | 6/2007 | Palmateer et al. | |
| 2007/0229805 A1 * | 10/2007 | Engelbart et al. | 356/237.1 |

FOREIGN PATENT DOCUMENTS

| | | |
|---|---|---|
| WO | 2006114216 A1 | 11/2006 |
| WO | 2006118692 A1 | 11/2006 |

OTHER PUBLICATIONS

International Search Report of PCT/US2008/072336; Oct. 24, 2008; 14 pages.

* cited by examiner

METHODS AND SYSTEMS FOR AUTOMATED PLY BOUNDARY AND ORIENTATION INSPECTION

BACKGROUND OF THE INVENTION

This invention relates generally to fabrication of layered composite materials, and more specifically, to methods and systems for automated ply boundary and orientation inspection.

In some current production situations, the fabricator is required to inspect 100 percent of the ply placements for a composite structure using optical laser templates (OLT). While it is possible to use other large scale metrology methods, such as laser radar, OLT is currently the most efficient method of inspection. With certain structures, this inspection process takes, on average, between thirty and ninety minutes per ply. These structures may include sixty to seventy or more individual plies. As is easily understood, this OLT inspection turns out to be a significant portion of the total flow time utilized in the fabrication of the structure, which in certain instances may be a composite fuselage barrel for an aircraft. While this may be acceptable in a prototyping environment, it is not acceptable in a manufacturing environment. In an increased production rate environment, the task of inspecting ply boundaries utilizing the OLT process greatly inhibits the rate capabilities of a production facility. In addition, as the composite structures may be modified, for example, a stretched version of the composite fuselage, the OLTs may not have the capability to project at a needed accuracy over an enlarged surface.

As described above, OLTs are the currently preferred method of inspecting ply boundaries and the orientation of individual plies. After each ply is placed with, for example, a fiber placement machine, OLT units are indexed to a cure mandrel and the appropriate ply is projected onto the surface of the composite structure currently being fabricated. After a projection is established, an inspector visually compares an edge of the projected ply boundary to an edge of the recently placed composite ply. Any areas of question are measured and reworked. When working with a large structure, such as the full surface of a fuselage barrel, an angle of incidence issue arises. Specifically, due to a limitation on the angle of incidence between the laser projection and the part surface, a full fuselage ply must be projected onto in multiple (e.g., at least six) segments of the OLT to cover the full circumference of the fuselage.

As mentioned above, the current OLT process is time consuming. On average, thirty or more hours are attributed to inspection of ply boundary and orientation for a full fuselage part, which is unacceptable in a high rate of production environment. In addition to the throughput rate limitations of the current OLT system, there are some technical limitations as well, such as the angle of incidence problem described above. When a single OLT is pushed beyond its operating capabilities, either part tolerances have to be relaxed, multiple OLTs augmented by metrology systems have to be utilized, or an alternative ply boundary verification system will need to be used. Currently, there is no more acceptable and cost effective process for inspecting ply boundaries than OLT.

BRIEF DESCRIPTION OF THE INVENTION

In one aspect, a method for determining the positional laydown accuracy of an automated lamination machine during fabrication of a multiple layered part is provided. The method includes measuring a position of a placement head of the lamination machine in a coordinate system, determining a location of a ply edge with respect to the placement head, transforming the location of the ply edge into the coordinate system based on the measured head position, transforming the location of the ply edge from the coordinate system into a second coordinate system that is associated with the part being fabricated, and comparing actual ply edge location in the second coordinate system to an expected ply edge location defined in the second coordinate system, the second coordinate system associated with the part being fabricated, to determine the laydown accuracy of the machine.

In another aspect, an automated fiber placement (AFP) machine is provided. The machine includes an AFP head, at least one positioning device configured to provide a position of the AFP head within a coordinate system, and a vision system. The vision system is configured to determine an edge placement of a ply of fiber material as the material is placed by the AFP head. The machine is programmed to calculate a position of the edge of the ply based on a position of the vision system with respect to the AFP head, and transform the position from a coordinate system associated with the AFP head to a coordinate system associated with a part fabricated by the machine.

In still another aspect, a method for determining a position, within a coordinate system, for an edge of a ply of fiber material placed on a part mandrel is provided. The method includes determining, utilizing a plurality of tracking devices having a known position in the coordinate system, distances to a placement head, receiving an orientation of the placement head from an inertial device, calculating a position and orientation in space for the placement head from the orientation, distances, and known positions, identifying, utilizing a vision system, an edge for the fiber material, a position of the vision system based on the position of the placement head, determining an orientation of the vision system with respect to the part mandrel, and calculating a position of the identified edge based on the position of the placement head and the orientation of the vision system.

DETAILED DESCRIPTION OF THE INVENTION

To address the above described issues with ply boundary and orientation inspection, embodiments of the described methods and systems are utilized to increase rate capability, reduce recurring flow time, reduce labor hours, and enable ply inspection on future versions and variations of the composite structure, which in a particular embodiment, is a composite component for a fuselage barrel.

The described embodiments utilize a vision system, combined with laser tracker measurement devices, or other position measuring devices, and encoders, to map where carbon fiber material is being placed on a cure mandrel (or tool) by automated fiber placement machines. More specifically, the system records where the material is being placed onto the tool and compares it against the nominal material placement engineering data set in order to indicate areas of placement that are outside of manufacturing tolerances.

As described above, the current optical laser template (OLT) process is time consuming. On average, thirty or more hours are attributed to inspection of ply boundary and orientation on a fuselage barrel. In addition to the rate limitations of the OLT process, there are also technical limitations, such as described above with respect to large structure and the angle of incidence of the laser against the surface of the structure being fabricated.

Figure 1:
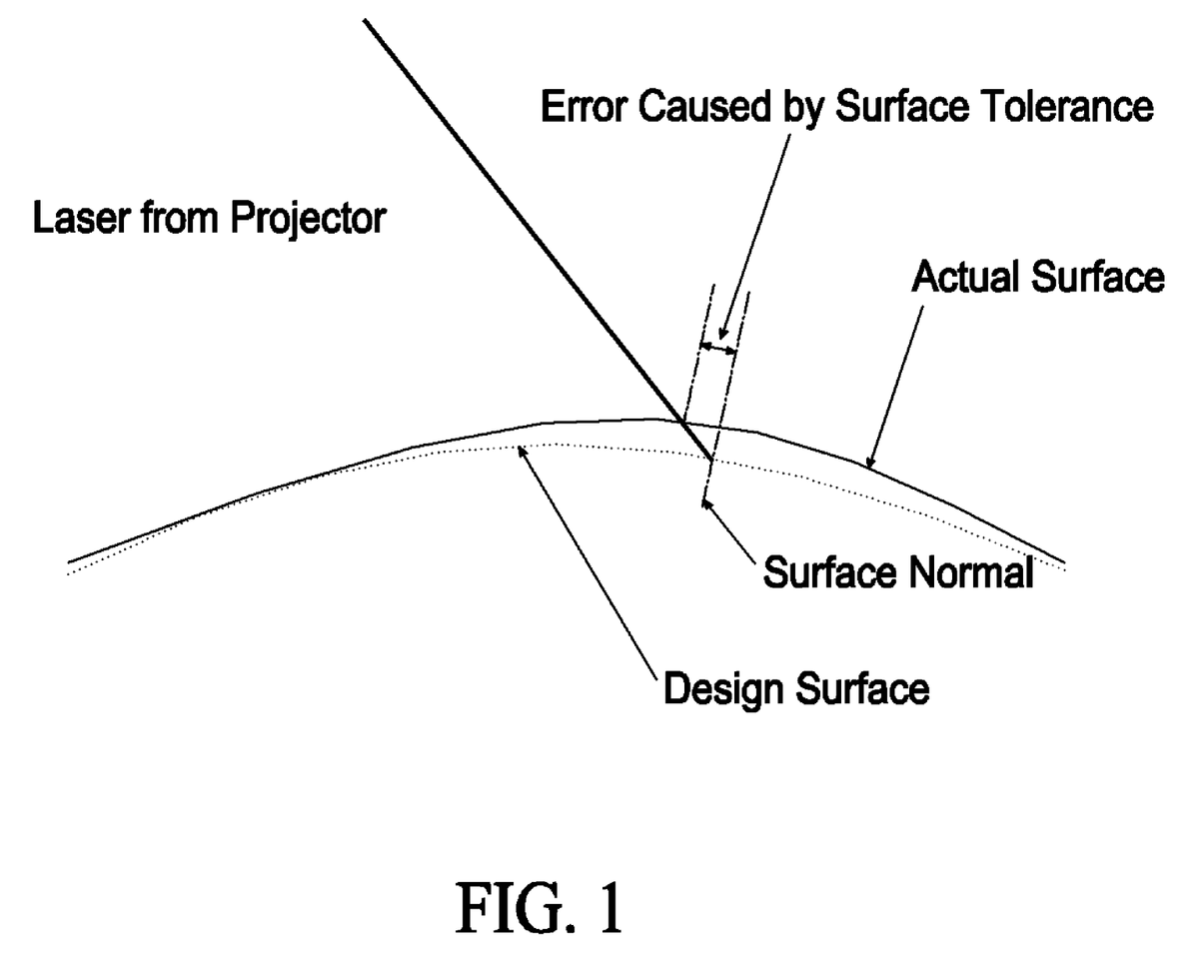
FIG. 1 is an illustration of the effect of surface tolerance on projection uncertainty for an optical laser template.

To further illustrate, FIG. 1 is an illustration of the effect of surface tolerance on projection uncertainty for an incident ray from an optical laser template. FIG. 1 further illustrates one of the limitations of the OLT process and the need for limiting the projection angle on the surface of a cure mandrel. As the angle between the surface normal and incident laser light gets greater, potential errors related to mandrel shape, as opposed to material location, dominate. These errors can be mitigated by limiting the difference between the surface normal and incident ray, however the projection process has to be repeated at additional angles of mandrel rotation, further slowing the inspection process.

Figure 2:
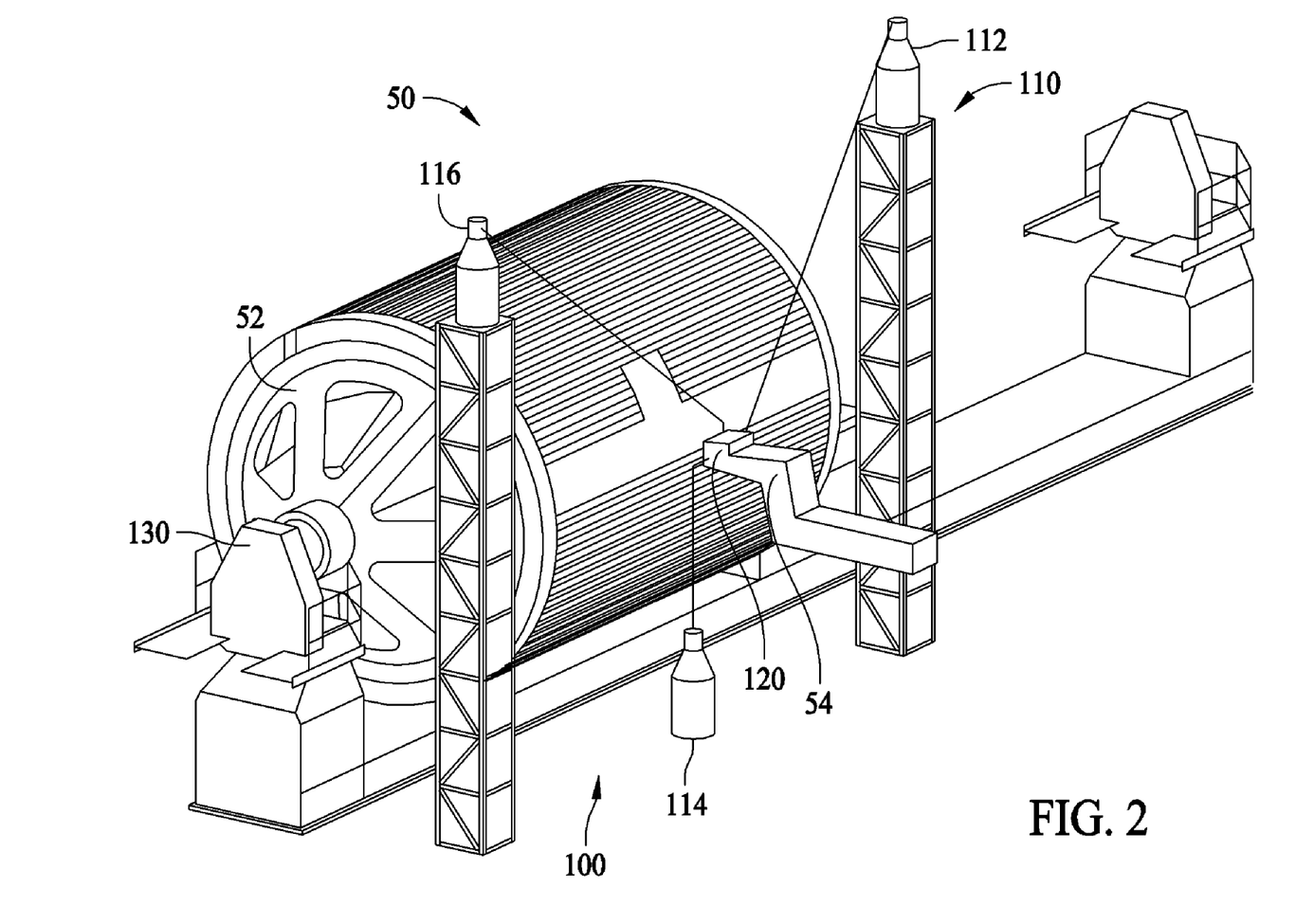
FIG. 2 is an illustration of a ply placement system that includes a mandrel around which a carbon fiber or other material is placed.

FIG. 2 is an illustration of a ply placement system 50 that includes a mandrel 52 around which a carbon fiber or other material, for example, is placed. The material is placed onto mandrel 52 from an automated fiber placement (AFP) head 54. Certain components of one embodiment of an automated ply boundary and orientation inspection system 100 are also illustrated. In the illustrated embodiment, a laser tracking system 110 of three laser trackers 112, 114, and 116, a vision system 120, an encoder 130 (linear or angular depending on installation) are combined to form boundary inspection system 100. Optionally, gyroscopes (not shown in FIG. 2), and/or global positioning systems (not shown) can be utilized alone to provide positional information related to the AFP head 54 or in conjunction with one or more of the laser trackers. In certain embodiments, gyroscopes and/or GPS are utilized to reduce the number of laser trackers needed or eliminate them altogether.

The laser trackers 112, 114, and 116 are each configured to project a laser beam at a mirror or a corner cube mirror mounted on AFP head 54 so that it always reflects the laser beam back where it came from. Basically, each laser tracker 112, 114, and 116 measures the distance and angles at which the laser beam is being projected very accurately. Each laser tracker provides three dimensional coordinates of the reflection point, which is referenced to the AFP head 54. With at least three laser trackers, and three reflection points (mirrors) on the AFP head, it is possible to have the three points in space where the mirrors are, and then calculate a position for the AFP head 54 and, whether it is being rotated or moved up and down. The position, or point in space, for the laser target (shown FIG. 3), and thus the AFP head 54, can be calculated because the point in space where the laser trackers have been placed is known, and the trackers have measured the distance to and the angle back from the laser targets.

More specifically, the boundary inspection system 100 is configured to utilize the vision system 120 to automatically determine edge placement of a ply of the material as it is being placed onto mandrel 52 based on a position of AFP head 54. Ply edge locations from the vision system 120 in the AFP head 54 are transformed into a coordinate system of the structure being fabricated by using positional information of the AFP head 54. This coordinate system is sometimes referred to as the part coordinate system. The positional information is obtained through measurement instruments (e.g., laser tracking system 110 and gyroscope) in association with the boundary inspection system 100 and the mandrel rotational position which is obtained from the encoder 130.

Once ply edges have been transformed into the part coordinate system, software is utilized to compare the nominal ply edges to the points created utilizing the boundary inspection system 100. In specific embodiments, the comparison is summarized as either a pass/fail test or a quantitative assessment is used. The quantitative assessment is used to graphically highlight any areas where plies were placed outside of acceptable positional limits. This assessment is done real time or with minimal post processing time.

One result from utilization of the above described system, boundary inspection system 100, is a method of product acceptance using a camera, metrology equipment (e.g., laser tracking devices and gyroscopes), and analysis software used during automatic fiber placement manufacturing as opposed to the visual inspection of a laser projection after a portion of the fabrication process (e.g., a ply layer) is complete as described above. The major difference between inspection using boundary inspection system 100 and the currently existing OLT process is that that system 100 operates while the carbon fiber or other material is being applied. In the OLT process, deviations from nominal are typically reworked by the inspectors, for example, during the inspection process. However, with such a procedure the defects found and anomalies corrected are sometimes not recorded. With the automation of boundary inspection system 100, traceability of all ply placements is possible. Therefore each anomaly is recordable and can be used as data for continuous quality improvement of lay-up techniques and programs. In a specific embodiment, defect and anomaly information can be fed back into the AFP machine for on the fly corrections, resulting in a closed loop ply placement system.

Now referring to the individual components of boundary inspection system 100, the vision system 120, which may include one or more cameras, proximity sensors, and lasers, is mounted to the head 54 of the automated fiber placement machine and alone or in combination observe the fiber material being placed onto the mandrel 52. One output of the vision system is where the ply edges are relative to the vision system itself.

Measurement equipment, including one or more corner cubes for the laser trackers, gyroscopes, and global positioning systems, are also mounted on the head of the AFP machine, and are used to measure the position and orientation of the AFP head, and the vision system mounted thereon, relative to the mandrel associated with the part being fabricated. The above mentioned encoder is utilized to monitor the rotational position of the part mandrel 52 relative to the laser trackers. Data from the individual components of boundary inspection system 100 are utilized to transform a set of measured points into a coordinate system associated with the part being fabricated. For example, for a portion of an aircraft fuselage, the data is transformed into aircraft coordinates.

A software program is then utilized to compare the locations of these points to the nominal ply boundary positions of each ply. Comparisons between nominal and observed ply boundaries can be done real time, or as part of a post processing operation. To summarize, boundary inspection system 100 is able to measure where material is being placed onto the cure mandrel 52, transform those measurements into part coordinates, and compare those measurements to a nominal engineering part definition.

Figure 3:
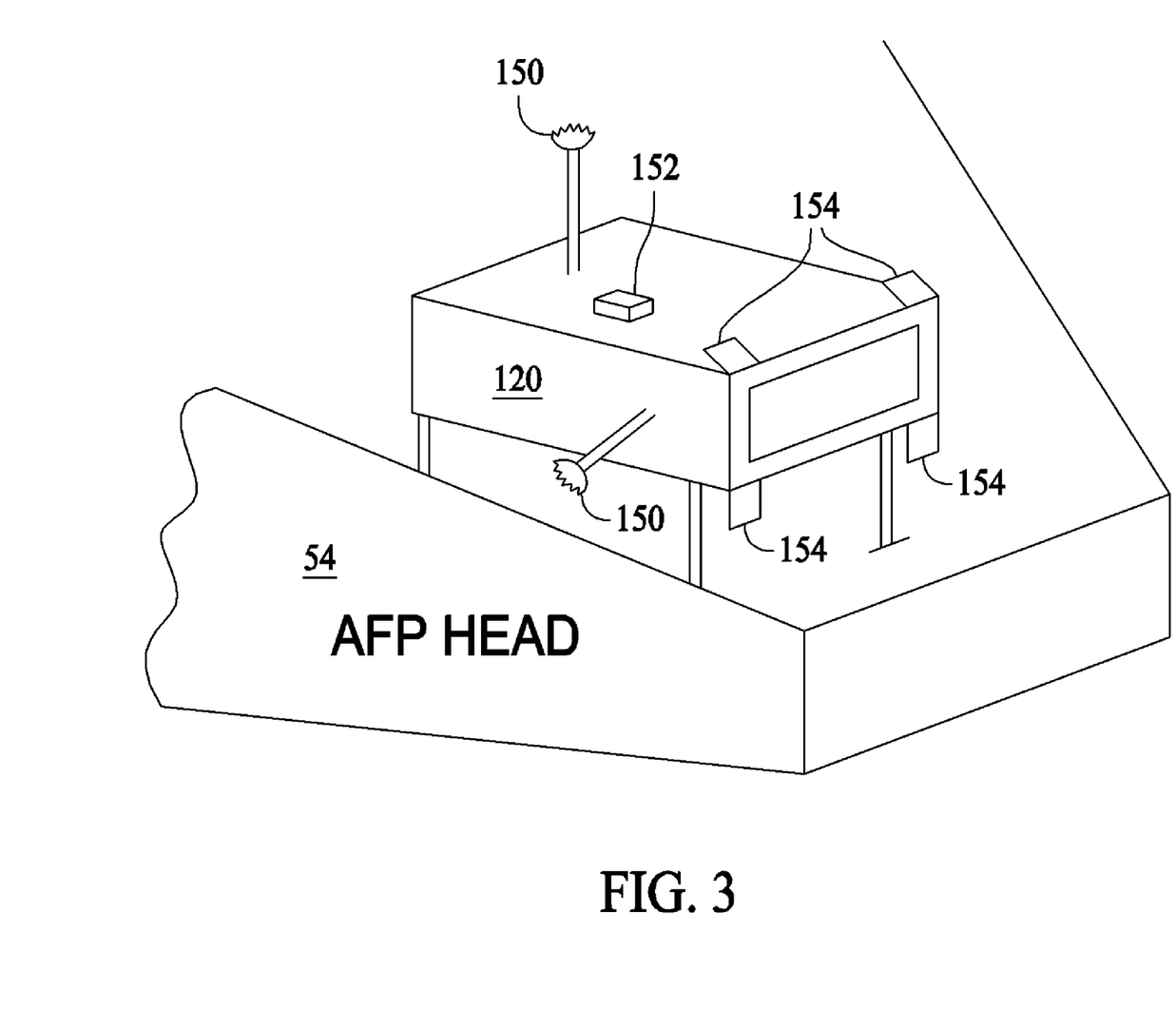
FIG. 3 is a detailed view of an automated fiber placement (AFP) head onto which a vision system and other components are mounted.

FIG. 3 is a more detailed view of one embodiment of automated fiber placement (AFP) head 54. As illustrated, mounted to head 54 are the vision system 120, laser targets 150 (sometimes referred to herein as a mirror, a reflecting device, or a corner cube), the above described gyroscope 152, and a plurality of proximity sensors 154 mounted on or adjacent the vision system 120. In at least one embodiment, the laser targets are located on the AFP head 54 so that as the head 54 rotates and targets become occluded, the laser trackers can switch to other targets 150.

In various embodiments, vision system 120 is operable to project one or more laser lines. In either embodiment, the laser projection onto a surface of the part being fabricated is at an angle of incidence to the surface normal. Any variations in surface height result in discontinuities from the perspective of vision system 120. The discontinuities are of known positional relationship to the vision system 120. Discontinuities in the projected laser lines are utilized to determine where the edges of plies being laid down onto the rotating mandrel 52 are within a frame of reference for vision system 120. To correlate the vision system frame of reference to the part surface, as relative distances and orientations may vary, multiple proximity sensors 154 are used to project laser dots that, in one embodiment, roughly correlate to the four corners of the field of view of vision system 120. It is not critical that there are four laser dots, or that they are located at the four corners of the field of view. For example, embodiments that utilize three or more projected laser dots anywhere within the field of view of vision system 120 may be utilized to define the surface plane. By correlating the position of these laser dots in the vision system picture, to the known projection positions of these sensors, and the distance readout by each of these sensors, a three dimensional coordinate position can be interpolated for each laser line discontinuity. This correlation produces a three dimensional coordinate of ply edge location relative to the AFP head 54.

Using the known position of the AFP head 54, determined by the system of laser trackers 112, 114, and 116 (shown in FIG. 2), and gyroscope 152, the three dimensional position of the ply edge can be transformed into the coordinates associated with the gyroscope 152. To complete this metrology system, a device that provides a measurement of the mandrel position and rotation is provided, such as the encoder 130 (shown in FIG. 2. Transforming the rotating mandrel coordinates into the coordinates associated with tracker coordinates, is a two step process. In a first step, the mandrel orientation at a known rotation angle is measured with a tracking interferometer, and in a second step, an orientation of the mandrel 52 is measured with encoder 130.

The transformation from AFP head coordinates to part coordinates is essentially two transformations, AFP head to tracker coordinates, and tracker coordinates to mandrel (or part) coordinates. An algorithm will compute the part coordinates as the position of the AFP head 54 changes and the mandrel 52 rotates. There are static parameters for the initial mandrel orientation that are measured by the tracker and loaded into this function. Thus measurements recorded by the vision system 120 are transformed into part coordinates.

Once ply edges are defined in the part coordinate system, a direct comparison between actual position and engineering nominal position is made. One method of comparing the measured data to nominal position as defined, for example, by one or more computer aided design (CAD) files is to define the corners of the lay-up with points, and vectors normal to the outside mold line of the part that intersect these vertices. The measured points are compared to a plane between the two vectors. Measurements can also be made using third party software for the verification of the lay-up process.

Software for the analysis of ply edge location on a simple contour with respect to the CAD model is included in one embodiment. The CAD information at vertices of the plies in the model is used and combined with normal vectors based on the outside mold line. A measured point on the ply edge is compared to its nominal location by examining the distance of the measured point to a plane formed between the two nearest normal vectors. This analysis eliminates the radial variation from the analysis due to variable compaction of the material and radial errors in the mandrel 52.

Figure 4:
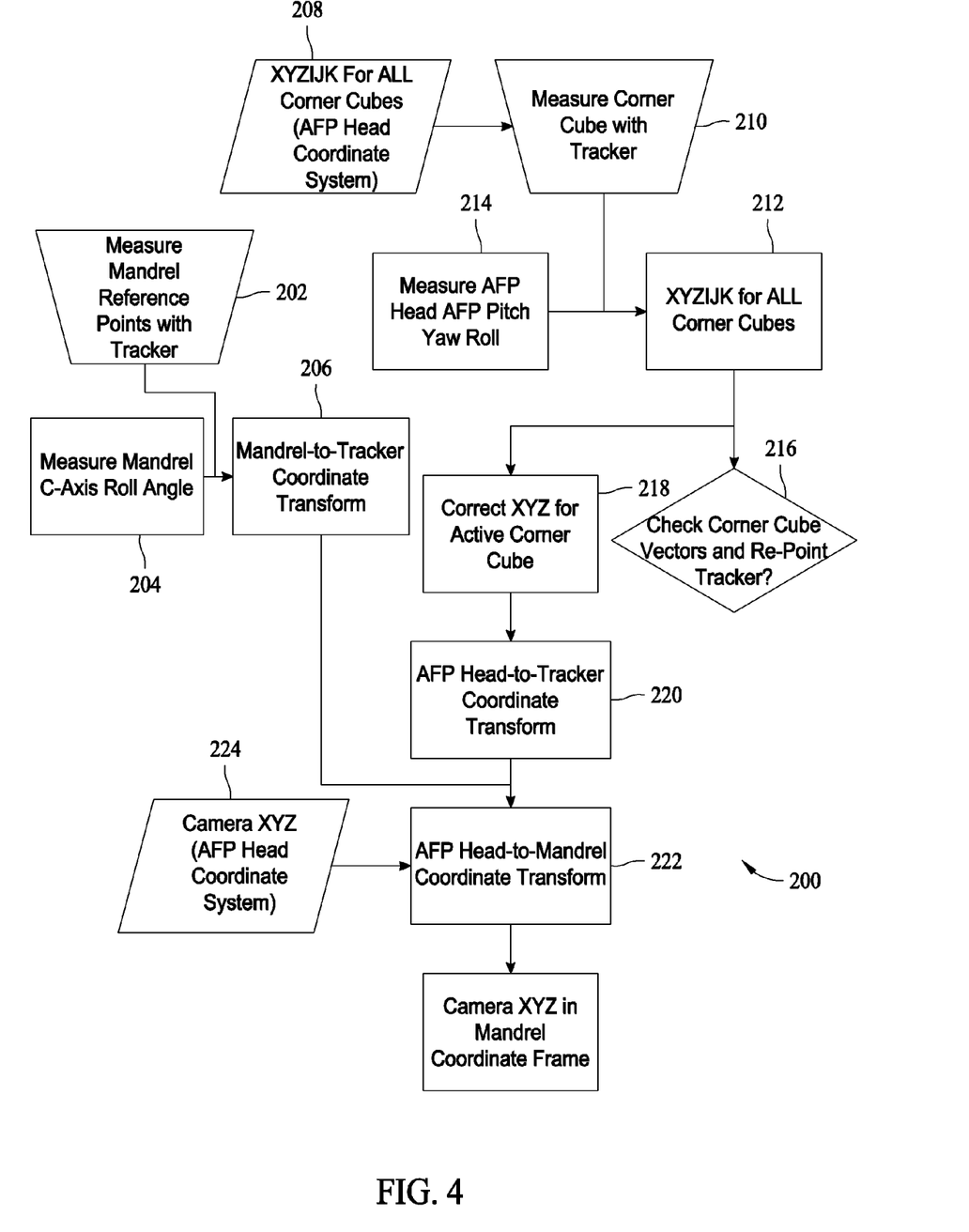
FIG. 4 is a flow diagram illustrating a transformation from AFP head coordinates to a mandrel (part) coordinate system.

FIG. 4 is a flow diagram 200 which further describes operation of system 100 by illustrating one method of transformation from AFP head coordinates to a mandrel (part) coordinate system.

Reference points on the mandrel 52 are measured 202 before motion of the AFP head 54 is monitored, or tracked and a roll angle of the mandrel is determined 204. An orientation of the mandrel with respect to the tracking system (laser, gyroscope, GPS, or any combination thereof) is computed 206 utilizing a transform.

At least three points are needed on a given body to know its x, y, z position in space and its i, j, k, or rotational orientation, in space as illustrated in box 208. The embodiment that utilizes the three laser trackers 112, 114, and 116 of FIG. 2, along with their respective corner cubes, are utilized in computation of the position and orientation of the AFP head 54. Specifically, the location for each corner cube is measured 210 by the respective laser tracker, and given known locations for the corner cubes with respect to the AFP head, the x, y, z position and its i, j, k orientation for the AFP head 54 is computed 212. In an alternative embodiments, pitch, yaw, and roll can be calculated, without readings from a gyroscope, but from the points defined by the three laser trackers 112, 114, and 116.

In an alternative embodiment, depending on an accuracy of the gyroscope 152, a position of AFP head 54 can be calculated using only one laser tracker and the gyroscope 152. Therefore embodiments that incorporate gyroscope 152, also provide a measurement 214 of pitch, yaw, and roll, eliminating the need for one or two of the laser trackers. The flow diagram 200 of FIG. 4 takes into account that the corner cube vectors and the trackers have to be checked 216 and re-pointed the tracker to a corner cube with a more optimal orientation (e.g., smaller incidence angles).

When correcting 218 x, y, and z for corner cube laser targets 150 that are active, the correction, or compensation, is based on angle of incidence. It should b noted that laser targets 150 can be either solid corner cubes or gimbaled corner cubes. The above described position of AFP head 54 is provided 220 in terms of the coordinate system associated with the laser tracking system, and transformed 222 into coordinates associated with the mandrel 52 onto which the material is placed. With the position of the AFP head 54 in space, and the vision system 120 mounted on the AFP head 54 to provide 224 where the fibers are being placed relative to the vision system, the two pieces of information can be utilized to determine where in space the fiber material is being placed. It follows that if it is certain where the material is being placed, then inspections and/or audits, can be made randomly or perhaps eliminated.

As described above and after data processing, the laser trackers 112, 114, and 116 each output a three-dimensional coordinate (an x, y, z position) and an orientation (an i, j, k direction). By compiling these outputs, a position of the AFP head 54 can be calculated. With regard to the vision system 120, the individual cameras provide a two dimensional picture of the area where fiber is being placed. Using the two dimensional pictures and the position of the vision system within the AFP head 54, three-dimensional coordinates of where the edges of the plies are being laid can be calculated.

More specifically, coordinates of where the ply edges are determined through the use of proximity sensors, which in one embodiment are small laser distance measuring devices. As described above, with one of the proximity sensors in each corner of the two dimensional picture, the distance of each projected laser dot from the vision system can be determined. From the four dot distances, it can be interpolated where the mandrel surface, approximated by a plane, is located that is based on the four dots.

To provide further explanation, from a two-dimensional picture of a surface, it is not apparent if the surface in the picture is perfectly normal to the viewpoint of the vision system 120, or if it is skewed at an angle, or skewed at a compound angle. With the information above providing a distance to each corner of the picture is from the viewpoint, it can be calculated at what angle or what position that surface is, relative to the vision system 120. The two dimensional picture, plus the distance information from four proximity sensors is utilized to provide information as to where or how the plane is oriented relative to the vision system 120.

In an embodiment, parallel laser lines are projected across the center of the vision system field of view and utilized to discern the discontinuities in that laser which are indicative of the edge of a ply. Specifically, the laser beam is discontinuous where there is an edge to the ply. In the described embodiment, a laser line is projected at an angle to the ply surface so that when the heights of that surface changes (due to the application of the fiber material of the ply) the laser line is discontinuous. Algorithms are utilized in conjunction with the data supplied by vision system 120 to determine at which pixel location within the data the discontinuity in the laser line occurs. In conjunction with the above described position determinations, it is possible to calculate a position for the discontinuity, and thus a position of the edge of the ply being laid on the mandrel 52.

In practice, during application of a ply of fiber material, a picture is taken by the vision system 120 thirty times a second or so, resulting in a built up point cloud of edge or edge point locations, wherever plies are being placed, which can be compared against a nominal, or engineered definition resulting in confirmation of edge locations for a ply of material.

The cost savings associated with the automated ply boundary and orientation inspection system 100 described herein are substantial. As described above, roughly thirty to forty hours are spent per fuselage section inspecting ply boundary and orientation alone. By eliminating that flow time from the production process, the production rate capabilities associated with automated fiber placement is dramatically improved. A possible result is a reduction in flow time which may eliminate the need for additional automated fiber placement machines and rate tooling to maintain a specific production rate and lessen the risk of delayed deliveries of the fabricated parts to customers. Additionally, an automated and qualified inspection system such as system 100 described herein keeps any manufacturing anomalies documented and recorded while also improving part quality.

The above described solution to automatic fiber placement part inspections is an improvement to current manual inspection methods due to the reduced amount of flow time needed to conduct the required inspections. Such an inspection system enables a composite parts manufacturing program to expand the envelope of the size of parts produced without opening the part tolerances as opening parts tolerances typically results in a weight increase and part variation. System 100 is further adaptable to operate in conjunction with AFP machine controls to not only inspect where plies are being placed, but correct for any errors in the placement accuracy of the AFP machine during operation via a real-time feedback loop. Therefore, not only does system 100 automatically look for defects in the part being fabricated, but it also reduces ply lay-up away from the ply boundary defined in the CAD files for the part being fabricated.

While the invention has been described in terms of various specific embodiments, those skilled in the art will recognize that the invention can be practiced with modification within the spirit and scope of the claims.

What is claimed is:

1. A method for determining the positional laydown accuracy of an automated lamination machine during fabrication of a single or multiple layered part, said method comprising:
    determining a position of a placement head of the lamination machine in a coordinate system;
    determining a location of a ply edge with respect to the placement head using a machine vision system;
    transforming, with a processing device, the location of the ply edge into the coordinate system, based on the placement head position;
    transforming the location of the ply edge from the coordinate system into a second coordinate system that is associated with the part being fabricated;
    comparing actual ply edge location in the second coordinate system to an expected ply edge location defined in the second coordinate system, the second coordinate system associated with the part being fabricated; and
    determining the laydown accuracy of the machine based on the comparison.

2. A method according to claim 1 wherein determining a location of a ply edge comprises:
    operating a machine based vision system, the position of which is known with respect to the placement head, to project at least one laser line at an acute angle to the surface tangent and of known positional relationship to the vision system onto a surface of the part being fabricated;
    utilizing discontinuities in the projected at least one laser line to determine where, within a frame of reference for the vision system, the edges of plies are being laid; and
    correlating the frame of reference for the vision system to the surface of the part being fabricated.

3. A method according to claim 2 wherein correlating the frame of reference for the vision system to the surface of the part comprises:
    defining a mounting position of a plurality of proximity sensors with respect to the vision system;
    projecting, utilizing the plurality of proximity sensors, onto the surface of the part, signals that substantially correlate to the field of view of the vision system; and
    correlating the position of the projected symbols on the part being fabricated to the defined mounting positions of the proximity sensors.

4. A method according to claim 3 wherein transforming the location of the ply edge into the independent coordinate system comprises interpolating a three dimensional coordinate position for each laser line discontinuity relative to a position of the placement head.

5. A method according to claim 1 wherein determining a position of the placement head in an independent coordinate system comprises:
    defining a mounting position of the plurality of laser tracking devices with respect to the placement head of the lamination machine;

receiving distances between the placement head and each respective laser tracking device; and correlating the distances received from the laser tracking devices with their mounting positions to determine a position of the placement head.

6. A method according to claim 5 further comprising utilizing a gyroscope to provide an orientation of the placement head.

7. A method according to claim 1 further comprising measuring an orientation and rotation of a mandrel associated with the part being fabricated utilizing at least one of an encoder, a global positioning system, and a tracking interferometer.

8. An automated fiber placement (AFP) machine comprising:
   an AFP head;
   at least one positioning device configured to provide a position of said AFP head within a coordinate system; and
   a vision system configured to determine an edge placement of a ply of fiber material as the material is placed by said AFT head, said machine programmed to calculate a position of the edge of the ply based on a position of said vision system with respect to said AFP head, and transform the position from the coordinate system associated with said AFP head to a coordinate system associated with a part fabricated by said machine.

9. An AFP machine according to claim 8 further configured to compare a determined ply edge location in the coordinate system associated with the part fabricated to an expected ply edge location defined in the coordinate system associated with the part being fabricated to determine an accuracy of machine placement.

10. An AFP machine according to claim 8 wherein said at least one positioning device comprises:
   a plurality of tracking devices each at a known position within the coordinate system associated with said AFP head; and
   a plurality of reflective devices mounted on said AFP head, said tracking devices configured to track a position of said AFP head within the coordinate system based on reflections received from said reflective devices.

11. An AFP machine according to claim 10 wherein said plurality of tracking devices are configured to provide a three dimensional location of a respective said reflective device, positions of said reflective devices referenced to said AFP head.

12. An AFP machine according to claim 10 wherein said at least one positioning device comprises a gyroscope configured to provide orientation data, said machine operable to correlate the received orientation from said gyroscope, and data from said tracking devices, to provide a position and orientation within the coordinate system for said AFP head.

13. An AFP machine according to claim 10 wherein said at least one positioning device comprises a global positioning system (GPS), said machine operable to correlate the received position from said GPS, and data from said tracking devices, to provide a position and orientation within the coordinate system for said AFP head.

14. An AFP machine according to claim 8 further comprising a laser source, wherein to determine edge placement, said laser source is configured to project at least one laser line of known positional relationship to said vision system, the projection across the center of the field of view of said vision system such that a discontinuity, indicative of the edge of a ply, can be discerned by said vision system, and a location of said discontinuity calculated by said machine.

15. An AFP machine according to claim 14 configured to measure a position of said AFP head with respect to a part mandrel associated with said machine.

16. An AFP machine according to claim 8 further comprising a plurality of proximity sensors, said proximity sensors in known positions with respect to said AFP head and dispersed such that in combination, projections from said proximity sensors onto the part fabricated by said machine substantially define the field of view of said vision system.

17. An AFP machine according to claim 16, said machine configured to receive a distance measurement from each of said proximity sensors, said machine further comprising a laser source configured to project at least one laser line of known positional relationship to said vision system across the center of the field of view of said vision system such that a discontinuity, indicative of the edge of a ply, can be discerned by said vision system, said machine further configured to:
   correlate the distances with a known position for each of said proximity sensors;
   interpolate a three dimensional coordinate position for each laser line discontinuity relative to said AFP head.

18. An AFP machine according to claim 8 further comprising an encoder configured to output data relating to a rotational position of a mandrel associated with the part relative to said plurality of laser tracking devices.

19. A method for determining a position, within a coordinate system, for an edge of a ply of fiber material placed on a part mandrel, said method comprising:
   determining, utilizing a plurality of tracking devices having a known position in the coordinate system, distances to a placement head;
   receiving an orientation of the placement head from an inertial device;
   calculating a position and orientation in space for the placement head from the orientation, distances, and known positions;
   identifying, utilizing a vision system, an edge for the fiber material, a position of the vision system based on the position of the placement head;
   determining an orientation of the vision system with respect to the part mandrel; and
   calculating a position of the identified edge based on the position of the placement head and the orientation of the vision system.

20. A method according to claim 19 wherein determining distances to a placement head comprises measuring the distances to respective reflective devices, the reflective devices being of known position with respect to the placement head.

21. A method according to claim 19 wherein receiving an orientation of the placement head comprises receiving pitch, roll, and yaw data from a gyroscope, the gyroscope being of known position with respect to the placement head.

22. A method according to claim 19 further comprising receiving a rotational position of the part mandrel relative to said plurality of laser tracking devices.

23. A method according to claim 19 wherein determining an orientation of the vision system with respect to the part mandrel comprises:
   measuring distances to the part mandrel utilizing a plurality of sensors, the sensors dispersed in a known position with respect to the placement head, projections from the sensors within a field of view of the vision system; and
   interpolating a three dimensional coordinate position for the identified edge relative to the placement head.

* * * * *